United States Patent [19]

Warty et al.

[11] Patent Number: 4,827,499

[45] Date of Patent: May 2, 1989

[54] CALL CONTROL OF A DISTRIBUTED PROCESSING COMMUNICATIONS SWITCHING SYSTEM

[75] Inventors: Pramod Warty, Freehold, N.J.; Edward J. Weiss, Naperville, Ill.

[73] Assignee: American Telephone and Telegraph Company AT&T Bell Laboratories, Murray Hill, N.J.

[21] Appl. No.: 62,538

[22] Filed: Jun. 12, 1987

[51] Int. Cl.$^4$ ...................... H04M 11/00; H04M 3/00
[52] U.S. Cl. ........................................ 379/58; 379/59; 379/63; 379/269; 455/33
[58] Field of Search ........................ 379/57, 58, 59, 60, 379/63, 225, 269, 112; 455/33, 86, 89, 90, 95; 370/58, 62, 67, 85; 371/11

[56] References Cited

U.S. PATENT DOCUMENTS

| | | | |
|---|---|---|---|
| 4,530,085 | 7/1985 | Hamada et al. | 370/15 |
| 4,599,490 | 7/1986 | Cornell et al. | 179/2 |
| 4,686,701 | 8/1987 | Ahmad et al. | 379/269 |
| 4,698,839 | 10/1987 | DeVaney et al. | 379/59 |
| 4,710,926 | 12/1987 | Brown et al. | 371/11 |
| 4,710,952 | 12/1987 | Kobayachi | 379/269 |

OTHER PUBLICATIONS

"Architecture Cellular System", *International Switching Symposium* 87, AT&T Technical Papers, (Network System), Mar. 15, 1987, pp. 251-266.
K. E. Crawford et al., "The AT&T No. 2 Signal Transfer Point Design and Service Introduction in the AT&T Communications Common Channel Signaling Network", *GLOBECOM '85*, vol. 1, Dec. 2-5, 1985, pp. 302-306.
W. Ulrich et al., "Translations in the No. 1 Electronic Switching System", *The Bell System Technical Journal*, vol. XLIII, No. 5, Part 2, Sep. 1964, pp. 2533-2573.
Z. C. Fluhr et al., "Advanced Mobile Phone Service: Control Architecture", *The Bell System Technical Journal*, vol. 58, No. 1, Jan. 1979, pp. 43-69.
Z. C. Fluhr et al., "Switching Plan for a Cellular Mobile Telephone System", *IEEE Transactions on Communications*, vol. Com-21, No. 11, Nov. 1973, pp. 1281-1286.
H. J. Hindin, "Cellular System Expands Number of Mobile-Phone Channels", *Electronics*, vol. 52, No. 11, May 24, 1979, pp. 158-164.
R. Van Malderen, "System 12 Review of the Fundamental Concepts", *Electrical Communication*, vol. 59, No. $\frac{1}{2}$, 1985, pp. 20-28.
P. W. Bowman et al., "Autoplex System 1000-A Modular High Capacity Advanced Architecture Cellular System", *International Switching Symposium* 87, AT&T Technical Papers, (Network Systems), Mar. 15, 1987, pp. 251-266.

*Primary Examiner*—Jin F. Ng
*Assistant Examiner*—David H. Kim
*Attorney, Agent, or Firm*—Werner Ulrich

[57] ABSTRACT

A method and apparatus for controlling calls in in a distributed processing communications switching system. A call is assigned to any one of a plurality of call control processors. The assigned processor thereafter directs the establishment of communications connections for that call. In the exemplary embodiment, the control of a cellular mobile communications switching system, a high speed data ring is used to communicate among a switching network, the call control processors, and call assignment processors of the system. Advantageously, each of the call control processors can be fully utilized since each may be flexibly assigned to any set of communications ports or terminals. New calls to a terminal which is already on an existing call are assigned to the call control processor assigned to control the existing call. Advantageously, call data for all calls to that terminal are therefore under the control of a single processor.

20 Claims, 3 Drawing Sheets

CALL CONTROL OF A DISTRIBUTED PROCESSING COMMUNICATIONS SWITCHING SYSTEM

TECHNICAL FIELD

This invention relates to apparatus and methods for controlling communications in a communications switching system and more specifically to distributed processing control of such systems.

PROBLEM

Many modern communications switching systems, including automatic private branch exchanges, use distributed control, wherein control of communications in the system is performed by a number of different processors. Typically, each such processor is associated with control of a fixed group of terminals in the switching system. Additionally, there is usually a single administrative processor for allocating communications resources and performing other administrative functions.

Distributed processor systems for controlling switching systems suffer from a number of capacity utilization problems. One problem is that the processing capacity of individual distributed processors is tied to a fixed group of terminals so that available capacity in one processor cannot be used to process overload of another processor. Therefore, if a distributed processor has more capacity than is required for serving the fixed group of terminals, this excess capacity is wasted, but if the processor has insufficient capacity, the fixed group of terminals cannot be adequately served. Another utilization problem is that available capacity in a processor which is tied to a fixed group of terminals cannot be substituted for serving traffic of a faulty processor tied to a different fixed group of terminals. Finally, a single centralized processor for performing administrative functions usually limits the capacity of the system.

Distributed processor systems also suffer from problems of coordinating control of a call among different processors. Some types of communications calls, such as conference calls, require interaction among several call terminals, each controlled by a different processor; control of such types of calls requires complex interactions among processors to control several terminals in a coordinated way.

Another problem of distributed processor systems is that data bases for distributed processors must be consistent; changes affecting data bases for two or more distributed processors must be made concurrently in order to avoid data conflicts.

Cellular mobile communications systems are most efficient when they serve mobile communications for a large area from a single source; consequently, for serving mobile communications, a system starting out at low cost but capable of growing to a very high capacity is especially desirable. An additional problem occurring in distributed control cellular mobile communications switching systems is that as a mobile moves, it is served by different radio cell sites, which may be controlled by different call control processors. The transfer of control from one such distributed processor to another requires substantial use of processor resources and serves to reduce the processing capacity of each distributed processor.

SOLUTION

All of the above problems are solved and an advance is made in the state of the art of distributed processing control of communications switching systems in accordance with our invention wherein, illustratively, a group of stored program controlled processors are interconnected by a high speed data communications system, in this case a ring structure, and wherein, in a departure from the prior art, the decision-making process for setting up connections between communications ports of a communications switching system is assigned to any one of a group of call control processors at the time a call is detected in the system. Thereafter, that processor retains control data for all ports subsequently associated with that call for the duration of that call.

In accordance with one specific embodiment, calls are assigned to a particular call control processor by one or more call assignment processors each responsible for assigning incoming calls for any of a group of directory numbers, or assigning originating calls for any of a group of terminals. In the case of a mobile communications switching system, each mobile unit is assigned a directory number, and the group of terminals assigned to one assignment processor corresponds to a group of directory numbers. Advantageously, a specific mobile unit and its associated directory number are assigned to a call control processor by a single assignment processor. Further, each portion of the data base of the system is assigned to one data base processor and the identity of that data base processor is made known to each call control processor. Advantageously, this permits a particular item of data to exist in only one location, thus eliminating data discrepancies. Allocation of shared resources, such as radio channels, is performed by resource allocation processors, wherein each of the call control processors knows which allocation processor is allocating which resources. Advantageously, each resource is allocated by a single processor thus avoiding allocation conflicts. A specific physical processor may act as one or more of a call assignment processor, call control processor, resource allocation processor and data base processor. Advantageously, such an arrangement further promotes full utilization of each processor.

In this embodiment, the communication ports are comprised within digital circuit switches. Cell sites for communicating with mobile units, controlled by cell site controllers, are connected to the digital circuit switches by cell site trunks. Signaling to and from ports comprised within the switches and control of such ports is performed by digital circuit switch control processors. Data messages for a given call are sent among call control processors, data base access processors, call assignment processors, resource allocation processors, digital circuit switch control processors, and cell site control processors as necessary under the control of the control processor controlling the given call. Advantageously, incoming and originating calls may be assigned dynamically to one of a group of call control processors in accordance with the traffic already being handled by each such processor, thus distributing load to those processors which have additional capacity available. Advantageously, only one call control processor directs all call connections associated with any active port.

In this cellular mobile communications system, some ports are connected to land communications for communicating with a common carrier network, and other ports are connected to cell site trunks for communicating with mobile communications terminals or units that may be associated with different radio transmitters on different cell sites as the mobile terminal moves across cell boundaries in a geographic region. In such a system the mobile units are typically identified by a directory number. All call connection actions associated with a particular directory number are directed by one call control processor assigned by an assignment processor for assigning incoming calls associated with a particular block of directory numbers. Resource allocation processors are used for assigning voice channels to the radio transmitters of the cell sites. Advantageously, in such an arrangement, call processing transactions such as those required to direct the setting up and tearing down of call connections, including those transactions for processing call waiting requests for a particular directory number, are performed by one processor.

In this embodiment, a ring structure is used as a means of conveying data messages among processors. Advantageously, such a structure allows a large volume of data messages to be sent rapidly among a large number of processors, thus permitting a system to have a very high call capacity.

Outgoing calls and tandem calls can also be controlled readily using the control structure of the invention as illustrated in the embodiment. When an origination is detected, a call control processor is assigned. For a mobile communications system, the assignment is based on the directory number of the caller. Advantageously, this call control processor can be assigned in such a way as to spread load evenly among a plurality of call control processors in order to avoid overloading any call control processor and to fully utilize the capacity of each call control processor.

Accordingly, in accordance with the principles of our invention, in a communications switching system comprising a plurality of call control processors, when a call is detected, the control for directing the establishment of connections for the call is assigned to any of that group of call control processors; the assigned processor then directs the establishment of connections for that call. Advantageously, in such a system reliability, processor capacity utilization, and ability to grow to a large call capacity are enhanced because call control may be assigned freely to any processor of a group.

DETAILED DESCRIPTION

The principles of this invention, which can also be applied to a private branch exchange or a telephone switching system, are illustrated in an illustrative embodiment of a control system of a cellular mobile communications switching system. Such a system is described, for example, in R. G. Cornell et al.: U.S. Pat. No. 4,599,490, and in T. E. Brinkman et al.: "AT&T's Autoplex TM System 10 Provides Cellular Telephone Service For Medium-Sized Metropolitan Areas", *AT&T Bell Laboratories Record*, November 1985, pp. 14–19.

Figure 1:
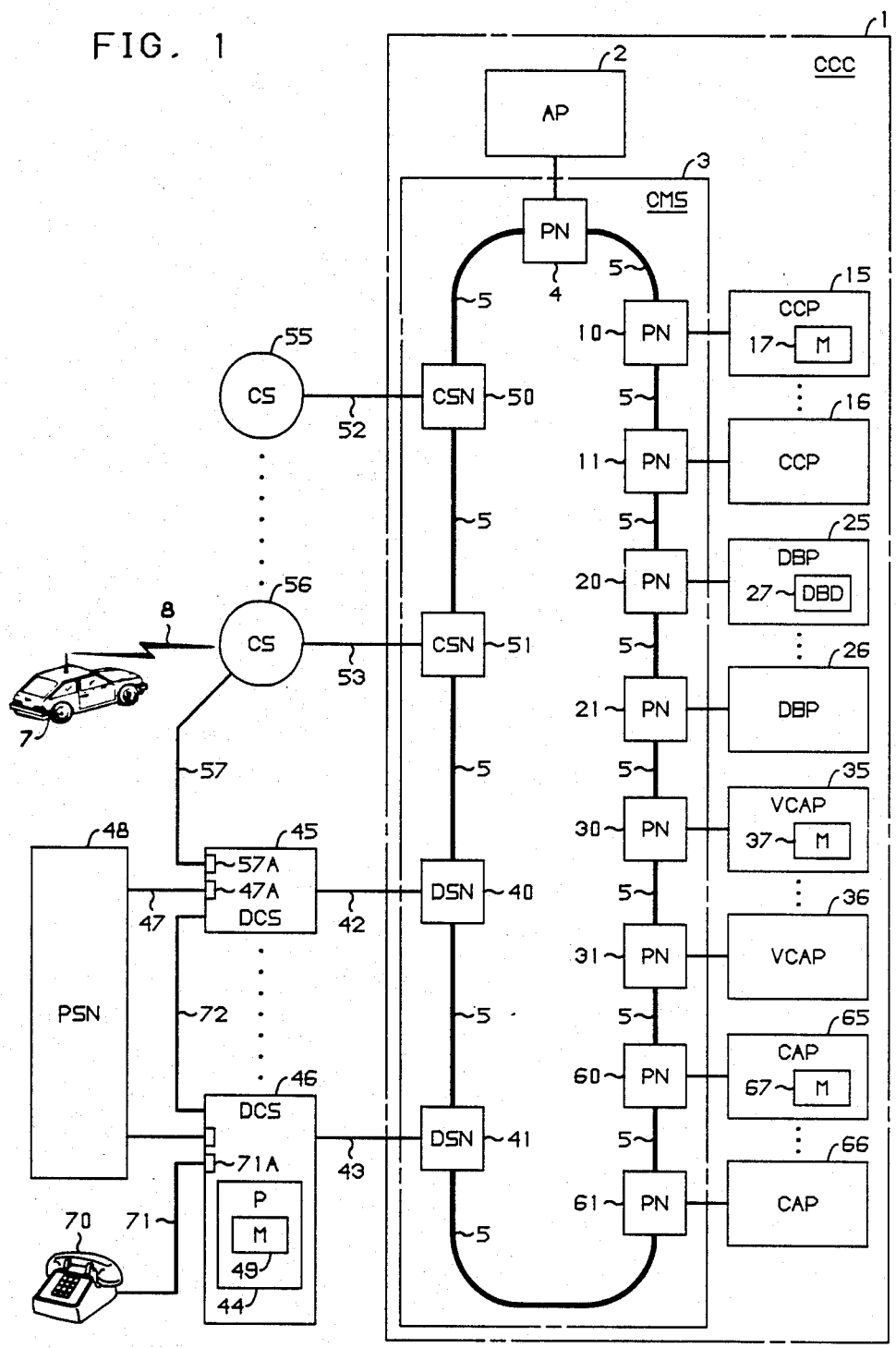
FIG. 1 is a block diagram of the control of a cellular mobile communications system comprising a plurality of cell sites and switches.

In the cellular mobile communications switching system illustrated in FIG. 1, radio antennas are located in geographical areas called cells, each of which has a cell site such as 55, . . . ,56. These cell sites are connected by land based transmission facilities, such as cell site trunk 57 interconnecting cell site 56 and digital cellular switch (DCS) 45, to digital circuit switches 45, . . . ,46 which are connected to a common carrier network such as the telephone public switched network PSN 48.

Assume that an incoming call is received from the PSN on trunk 47 at DCS 45. Signals for that incoming call may be received over the trunk or via a separate signaling system (not shown) such as the CCS7 signaling system standardized by CCITT. A mobile 7 is then paged by all cell sites equipped to send paging signals to locate the mobile and determine if it is available for service. Mobile 7 determines the cell site from which it receives the strongest signal. If mobile 7 detects a paging signal for itself, mobile 7 responds to that cell site, in this case, cell site 56. A connection is then set up through digital circuit switch 45, from incoming trunk 47 on which the incoming call is received to cell site trunk 57 connected to cell site 56. Cell site 56 then sets up a radio communications channel, voice channel 8, for communication between cell site trunk 57 and mobile 7.

FIG. 1 illustrates a control system designed in accordance with the principles of this invention. Cellular control complex 1 comprises a cellular message switch (CMS) 3, a ring for communicating among a number of processors. A message switch such as CMS 3 is described, for example, in K. E. Crawford et al.: "The AT&T No. 2 Signal Transfer Point Design and Service Introduction in the AT&T Communications Common Channel Signaling Network", *Conference Record of Globecom '85* (December 1985), pp. 302–306. The ring comprises groups of nodes 4,10, . . . ,11,20, . . . ,21,30, . . . ,31, 40, . . . ,41,50, . . . ,51,60, . . . ,61 each node being used for communicating between a processor and the ring, and a transmission medium 5 for interconnecting the nodes. Node 4 is directly attached to administrative processor (AP) 2; similarly, nodes 10, . . . ,11 are directly attached to call control processors (CCP) 15, . . . ,16; nodes 20, . . . ,21 are directly attached to data base processors (DBP) 25, . . . ,26; nodes 30, . . . ,31 are directly attached to voice channel assignment processors (VCAP) 35, . . . ,36; and nodes 60, . . . ,61 are directly attached to call assignment processors (CAP) 65, . . . ,66. In contrast, nodes 40, . . . ,41 are connected by data links 42, . . . ,43 to digital circuit switches (DCS) 45, . . . 46, respectively, and similarly, nodes 50, . . . ,51 are connected by data links 52, . . . ,53 to cell sites (CS) 55, . . . ,56.

Digital circuit switches 45, . . . ,46 are connected by trunks such as 47 to a public switched network 48 connected to communications terminals (not shown) and are connected directly to customer terminals such as CT 70 by lines such as customer line 71. The customer lines and the trunks are connected to ports such as 47A and 71A of the digital circuit switches. The ports are arranged in groups, one group per DCS entity such as DCS 46, and may be further divided into subgroups within each such entity. The digital switches are interconnected by trunks or links such as trunk 72, or in larger systems, by a stage of switching (not shown) such as the time multiplex switch described in Beuscher et al.: U.S. Pat. No. 4,322,843. Each DCS comprises a control processor such as processor 44 of DCS 46 for controlling connections in the switch, accumulating customer dialed information, and maintaining information on the status of ports. Each DCS control processor such as processor 44 comprises a memory such as memory 49 for storing dialed data and status information.

The processors within call control complex 1 are assigned in groups. Group 15, . . . ,16 comprises call control processors (CCP's) for performing call processing, each processor comprising a memory such as M17 of processor 15. Each of these processors retains data for controlling a plurality of calls. Processors 25, . . . ,26 are data base processors (DBP's) for accessing a data base device or random access memory such as DBD 27 of processor 25, in order to obtain translation data of the mobile communications switching system. Each DBP accesses a part of the data base which is stored with suitable redundancy so that failure of any processor or any data base device permits data to be recovered from some other source. Voice channel assignment processors (VCAP's) 35, . . . ,36, each comprising a memory M such as 37 of processor 35, are used for assigning voice channels in each cell site to particular calls. Call assignment processors (CAP's) 65, . . . ,66, each comprising a memory M such as 67 of processor 65, are used for assigning calls to one of the processors 15, . . . ,16. In order to illustrate the principles of this invention, the four groups of processors are shown separately. However, it is to be understood that any physical processor may have a plurality of functional roles. For example in a relatively small mobile communications system, a pair of processors is likely to be adequate for serving all traffic and therefore it is likely that each of these two processors will act as a call control processor, a data base processor, a voice channel assignment processor and a call assignment processor.

In such a system, the call assignment, data base and voice channel assignment tasks are initially assigned to specific processors. A percentage of the call control load is then allocated to each of the individual processors at initialization time, based on the load for that processor for other tasks such as call assignment, data base, and voice channel assignment. If overload is detected for any processor, the percentage load for that processor is reduced and the percentage load for other processors correspondingly increased. Then, as the overload disappears, the load for that processor is gradually increased until it is back to the initialized load. If any processor fails, its call assignment, data base and voice channel assignment tasks are reassigned to other processors and the call control load percentage is reassigned for each processor. The allocated call control processor load percentage is used to control allocation of calls to the different call control processors, so that, for example, a processor with a 25 percent allocation would receive every fourth call being assigned by a call assignment processor. However, to simplify call processing, calls to directory numbers already assigned to a call control processor are assigned to that processor without regard to the allocation percentage.

Figure 2:
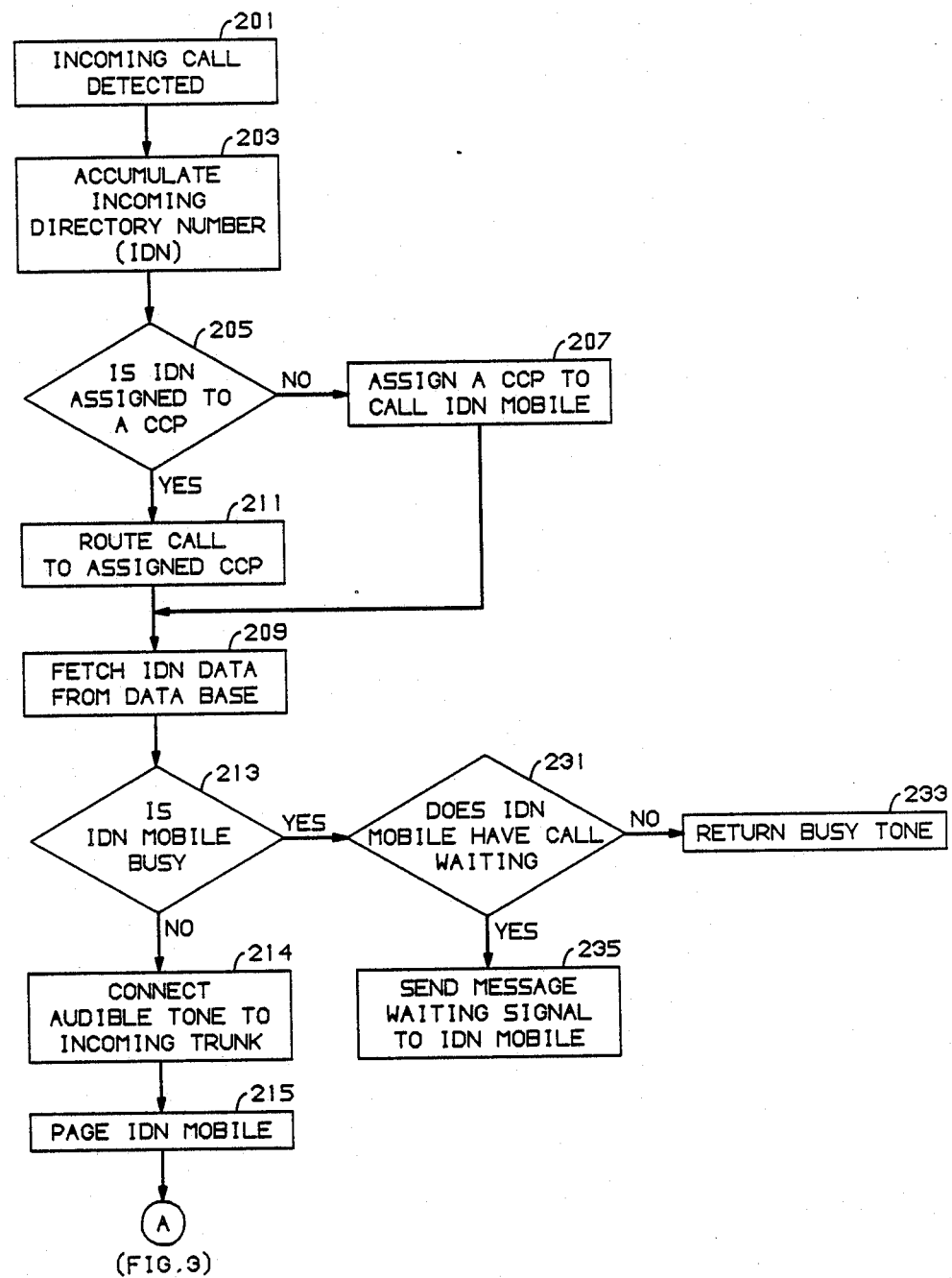
FIGS. 2 and 3 are flow diagrams of the process of setting up an incoming call in such a system.
Figure 3:
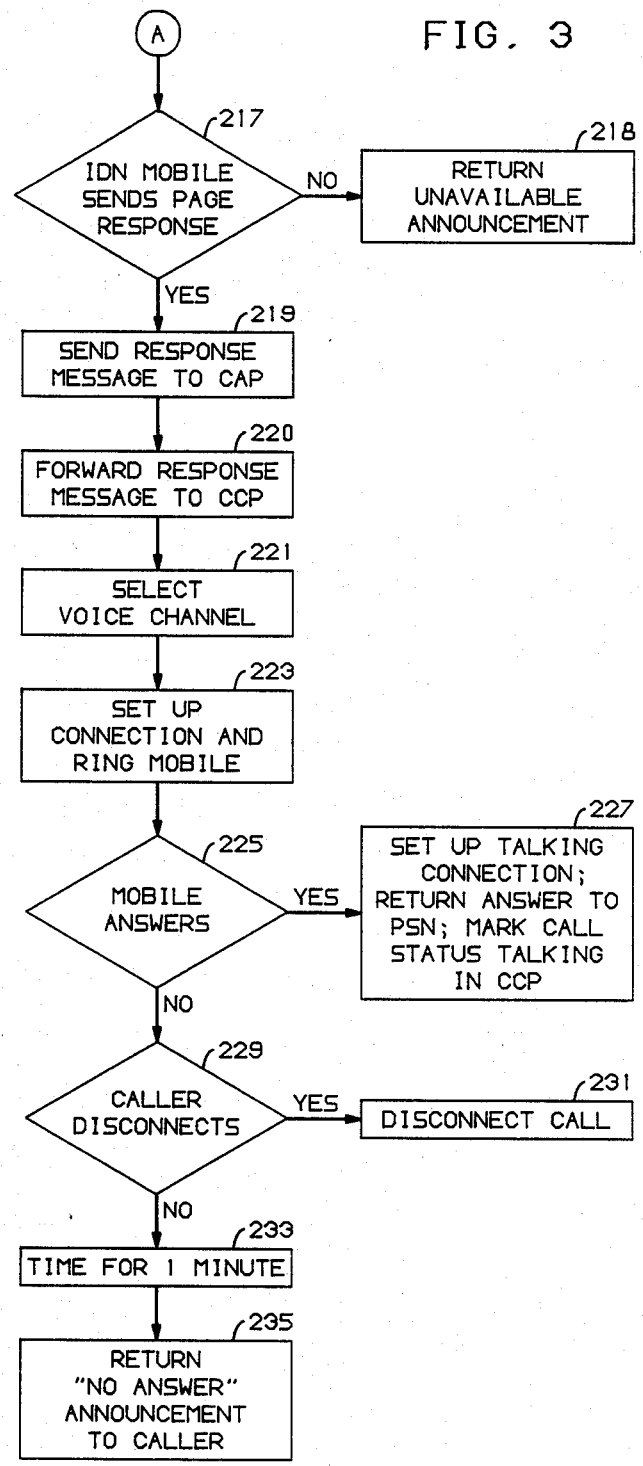

FIG. 2 illustrates the method for processing calls in accordance with the principles of this invention. An incoming call is used as an example. The incoming call is detected (action box 201) in a digital cellular switch 45. The digital cellular switch accumulates an incoming directory number, (IDN) (action box 203). Digital circuit switch 45 has data stored in the memory of its processor (not shown) indicating which call assignment processor of the group 65, . . . ,66 is responsible for assigning call processing for any particular incoming directory number. Assume that calls to the received IDN are assigned to call processing processors by assignment processor 65. DCS 45 sends a message over data link 42, via node 40, to transmission medium 5, thence to node 60 and call assignment processor 65 to inform processor 65 that an incoming call has been received for the IDN. Call assignment processor 65 checks the contents of its memory 67 to see if that IDN has already been assigned to a processor (test 205). If not, call assignment processor 65 assigns the call to one of the call control processors 15, . . . ,16 (action box 207). Assume that this call has been assigned to CCP 15. Call assignment processor 65 forwards an incoming call message including data such as the identity of the incoming trunk 47 and its trunk group number as identified by the DCS 45 and the incoming directory number (IDN) as accumulated in DCS 45 to CCP 15. CCP 15 needs data from the data base to describe the features available for the customer having the mobile unit identified by the IDN. CCP 15 has data indicating which of the data base processors 25, . . . ,26 have data for that IDN. Assume in this case that data for that IDN is stored in a data device accessed by data base processor 25. CCP 15 sends a message to data base processor 25 to request data characterizing the IDN (action box 209). This data is then returned to CCP 15 where it is stored for the duration of the call.

If test 205 indicates that the IDN has already been assigned to a call control processor, then data for that call is sent from call assignment processor 65, not to an arbitrarily selected call control processor but to the processor that has already been assigned to that call. For convenience assume that this is also call control processor 15. Data is then sent to processor 15 to indicate that a call has been received for the IDN (action box 211). CCP 15 sends a message to data base processor 25 to request data characterizing the IDN (action box 209). This data is then returned to CP processor 15 where it is stored for the duration of the call.

Call control processor 15 checks in the call records stored in its memory whether the mobile unit associated with the IDN, mobile unit 7 in this case, is busy (test 213). If not, audible tone is connected to incoming trunk 47 (action box 214). Audible tone is connected in response to a message from CCP 15 to DCS 45, requesting such a connection. Thereafter, mobile unit 7 is paged (action box 215). Paging is accomplished by sending paging request messages from call control processor 15 to all cell sites equipped with paging channels so that they may send a paging request to check whether the desired mobile unit is turned on and is in the area served by this mobile communications system. If mobile unit 7 is powered on, is within reach of a paging signal, and is within radio contact of a serving cell site, the unit sends a page response (test 217) to the cell site from which the unit receives the strongest signal, in this case, cell site 56. If the mobile unit 7 has sent such a response ("yes" output of test 217), thereby identifying the cell site to be used for this call, cell site 56 sends a page response message to call assignment processor 65 (action block 219). Call assignment processor 65 has recorded that this call has been assigned to CCP 15 and forwards the page response message to that processor (action block 220). CCP 15 has data indicating which of the channel assignment processors 35, . . . ,36 assign channels for cell site 56.

Assume in this case that channel assignment processor 36 performs channel assignment for cell site 56. CCP 15 sends a message to channel assignment processor 36 requesting the identification of an available channel in cell site 56 and channel assignment processor 36 makes this selection, in this case, by selecting voice channel 8 (action box 221). Channel assignment processor 36 sends the message back to CCP 15 identifying that channel. A connection is reserved between the incoming trunk 47 and cell site 56, in this case using trunk 57 and a path in DCS 45 between trunks 57 and 47; a connection is established between cell site 56 and the mobile unit 7 via radio over voice channel 8, all under the direction of messages from CCP 15 (action box 223). In order to set up the connection over voice channel 8, a control message is sent from cell site 56 to the mobile unit 7 requesting that unit to tune to voice channel 8 and to generate an alerting (ringing) signal.

The cell site 56 monitors the assigned voice channel 8 for an answer response from the mobile unit 7 (test 225). If the mobile answers ("yes" output of test 225), the previously reserved connection between cell site 56 and DCS 45 is established, audible tone is disconnected from incoming trunk 47 and the entire connection from the mobile unit 7 to incoming trunk 47 is set up. An answer signal is sent to PSN 48 to inform the caller's originating switch that the called customer has answered, and the call record maintained in CCP 15 is updated to indicate that the call is in the talking state. If mobile unit 7 does not answer ("no" output of test 225) the caller is monitored by DCS 45 for a disconnect signal (test 229). If the caller disconnects ("yes" output of test 229) the call is disconnected and memory records are cleared in processors DCS 45, CS 56, CCP 15 and CAP 65, and VCAP 36 is notified that voice channel 8 is available (action block 231). If the caller does not disconnect after about one minute (timing controlled by action block 233), than a "no answer" announcement is returned from DCS 45 to incoming trunk 47 (action block 235). The voice channel 8 is released, the reserved cell site trunk from CS 56 to DCS 45 is released, VCAP 36 is informed by a message from CCP 15 that voice channel 8 has been released, and call records in CCP 15 are updated to indicate availability of mobile 7; any subsequent call for mobile 7, coming in prior to the release of the connection to the announcement from the caller, will be referred to CCP 15 which still has a record of the call, but will recognize that a new call can in fact be attempted. This latter treatment is consistent with the software structure wherein all call control is associated with the directory number of an originating or terminating mobile unit, and wherein all call control actions associated with a given mobile unit are maintained in one call control processor.

If the mobile 7 does not respond to the page because the mobile unit is turned off or is outside the region of the mobile communications system ("no" output of test 217), then CCP 15 sends a message to DCS 45 requesting that an announcement indicating the unavailability of that mobile customer be returned to the trunk on which the incoming call was received (action box 218).

If CCP 15 finds that mobile unit 7 is busy, CCP 15 tests whether mobile unit 7 has the call waiting feature (test 231). If not, CCP 15 sends a message to DCS 45 to return a busy tone to the incoming trunk 47 (action box 233). If mobile unit 7 does have call waiting, then a message waiting signal is sent to mobile unit 7 (action box 235). CCP 15 has records indicating which DCS and cell site trunk is currently connected to mobile unit 7. The DCS (DCS 45 in this case) receives a message indicating that message waiting signal is to be sent over the trunk connected to mobile unit 7. Thereafter, the usual functions for giving subscribers call waiting treatment are executed.

Mobile to mobile calls, which represent a very small fraction of the total traffic, are processed in this system by treating each such call as an outgoing call and an incoming call. A loop around trunk, i.e., a trunk having two terminations on one DCS, acts as the "outgoing" and "incoming" trunks for that call. Thus, the two ends of the call are effectively isolated in the memory records of the system and are only connected by the fact that the two ends of the loop around trunk are both connected to the same DCS.

For a system in which intra-office calls represent a large fraction of the traffic, the basic principles of this invention can also be used for the bulk of these calls. If the called subscriber is idle, that subscriber can simply be assigned to the same processor as the calling subscriber. In case the called subscriber is not idle, that call can be treated as two separate calls using some convenient intra-office trunking facility such as described for the mobile phone system. With this arrangement, the straightforward assignment of all call control functions dealing with a particular subscriber to a single processor can be maintained.

It is to be understood that the above description is only of one preferred embodiment of the invention. Numerous other arrangements may be devised by one skilled in the art without departing from the spirit and scope of the invention. The invention is thus limited only as defined in the accompanying claims.

What is claimed is:

1. In a communications switching system comprising a plurality of call control processor means and a plurality of communications ports for connection to communication terminals, a method of processing a call comprising:

responsive to a call on one of said ports, assigning control for said call to any one of said plurality of call control processor means each for determining establishment of connections for calls on any of said ports; and responsive to said assigning step, determining establishment of connections from said one port for said call by the assigned call control processor means.

2. In the communications switching system of claim 1 further comprising at least one processor means for assigning control to one of said plurality of call control processor means, the method wherein said call is an incoming call, and wherein said assigning comprises:

accumulating a directory number for said call;

searching, in memory of one of said processor means for assigning control, for said directory number and a call control processor means associated with said directory number;

when the search finds said directory number, assigning control of said call to said call control processor means associated with said directory number; and when the search does not find said directory number, assigning control of said call to any of said call control processor means.

3. The method of claim 2 wherein the assigning step comprises selecting said one of said processor means for assigning control, in response to the accumulation of said directory number.

4. The method of claim 2 further comprising: prior to said searching in memory, transmitting a message comprising said directory number to said one of said processor means for assigning control for performing said searching step.

5. In the communications system of claim 2 wherein said system further comprises at least one processor means for accessing a data base, the method of claim 2 further comprising:
- accessing one of said processor means for accessing a data base for data of said directory number; and
- sending said accessed data to the call control processor means that has been assigned control of said call in said assigning step.

6. In the communications system of claim 2 further comprising a plurality of mobile communications cell sites for communicating via voice channels to mobile telephone communications units, the method of claim 2 further comprising:
- paging a mobile telephone communications unit having said directory number;
- in response to said paging of said mobile unit, identifying a cell site for communicating with said mobile terminal; and
- sending the identity of said cell site to the call control processor means assigned for said call.

7. The method of claim 6 wherein the step of sending the identity of said cell site comprises the steps of:
- sending said identity to said one of said processor means for assigning control; and
- sending said identity to said call control processor means assigned for said call.

8. In the communications system of claim 6 further comprising at least one processor means for assigning voice channels in each of at least one cell site, the method of claim 6 further comprising:
- determining which of said at least one processor means for assigning voice channels assigns voice channels for the cell site identified in said identifying step; and
- selecting a voice channel in said identified cell site, under the control of the processor means for assigning channels for said identified cell site, for communicating with said mobile terminal.

9. The method of claim 1 further comprising:
- allocating a proportion of call traffic to each processor means of said plurality of call control processor means; and
- wherein the step of assigning control comprises selecting one of said call control processor means in accordance with said proportion and assigning control for said call to the selected call control processor means.

10. In the communications switching system of claim 9 further comprising a plurality of cell sites for communicating via voice channels to mobile telephone communications units and at least one processor means for assigning radio voice channels for communications between said cell sites and said mobile units, wherein said call is an incoming call, the method of claim 9 further comprising:
- accumulating a directory number for said call;
- paging a mobile unit identified by said directory number;
- if the result of said paging is successful identifying a cell site for communicating with the mobile unit that responded to the paging; and
- requesting assignment of a voice channel for communicating with said mobile unit from one of said processor means for assigning voice channels.

11. In the communications system of claim 1 further comprising a plurality of mobile communications cell sites for communicating via voice channels to mobile telephone communication units and at least one processor means for assigning control for a call to one of said plurality of call control processor means, the method further comprising:
- receiving a call, representing a call from a mobile unit, on one of said communications ports; and
- identifying the directory number of said mobile unit; and
- wherein the assigning step comprises:
- searching in memory of one of said processor means for assigning control for said directory number and a call control processor means assigned to a call associated with said directory number;
- when the search finds said directory number, assigning control of said call to said call control processor means associated with said directory number; and
- when the search does not find said director number, assigning control of said call to any of said call control processor means.

12. A communications switching system comprising:
- switching network means, comprising a plurality of communications ports connectable to communications terminals, for setting up communication connections among said ports;
- a plurality of call control processor means for determining establishment of connections by said switching network means; and
- means responsive to a call on any one of said ports for assigning said call to any one of said plurality of call control processor means to determine establishment of connections for said call.

13. The system of claim 12, wherein said system comprises ports for connection to customer lines, each line associated with a directory number, wherein said switching network means comprises means for receiving call destination data comprising a directory number, and wherein said means responsive to a call for assigning call control processor means comprises at least one assignment processor means, for maintaining a record of which call control processor means have been assigned for controlling calls on which ones of a plurality of directory numbers of said system, and responsive to said call destination data for assigning said call to the call control processor means controlling a call for said directory number when said record indicates a call control processor means has been assigned for said directory number and for assigning said call to any one of said call control processor means when said record indicates no call control processor means has been assigned for said directory number.

14. The system of claim 12 wherein said means for assigning call control processor means comprise switching network processor means for controlling set-up of connections among ports of said switching network, said switching network processor means responsive to an outgoing call from a customer line for assigning any one of said call control processor means for said outgoing call.

15. The system of claim 12 further comprising translation data for ports of said system, further comprising at least one data base access processor means for accessing said translation data for said ports in response to requests from said call control processor means.

16. The system of claim 12 further comprising a data communications system for transmitting data messages among said means for assigning and said call control processor means.

17. The system of claim 16 wherein said data communications system comprises a ring interconnecting said call control processor means and said means for assigning.

18. The system of claim 12 further comprising a plurality of mobile communications cell sites connected to said switching network means for communicating over a plurality of radio voice channels with a plurality of mobile communication units.

19. The system of claim 18 further comprising at least one processor means for assigning a voice channel to a call in response to a request from one of said call control processor means.

20. A communications switching system comprising:
  switching network means, comprising a plurality of communications ports connectable to a public switched network for setting up connections among said ports;
  a plurality of call control processor means for determining establishment of connections among said ports by said switching network means;
  means responsive to a call one of said ports for assigning, independent of said one of said ports for said call, any one of said plurality of call control processor means to control initiation of establishment of connections for said call;
  a plurality of mobile communications cell sites for communicating over a plurality of radio voice channels with a plurality of mobile communication units; and
  at least one processor means for assigning a voice channel to a call in response to a request from one of said call control processor means;
  wherein some of said communications ports of said switching network means are connected to said mobile communications cell sites and others of said ports are connectable to a public switched network;
  wherein each of said plurality of mobile communications units is identified by one of a plurality of directory numbers of said communications switching system;
  wherein said switching network means comprises means for receiving call destination data comprising a directory number for an incoming call; and
  wherein said means responsive to a call for assigning call control processor means comprises at least one processor means for maintaining a record of which call control processor means have been assigned for controlling calls on ones of said plurality of directory numbers of said system, and is responsive to said call destination data for assigning said call to the call control processor means assigned for said directory number if a record for said directory number exists and for assigning said call to any one of said call control processor means if no such record exists.

* * * * *

UNITED STATES PATENT AND TRADEMARK OFFICE
CERTIFICATE OF CORRECTION

PATENT NO. : 4,827,499

DATED : May 2, 1989

INVENTOR(S) : Pramod Warty, Edward J. Weiss

It is certified that error appears in the above-identified patent and that said Letters Patent is hereby corrected as shown below:

In the claims, Column 8, claim 1, line 37, "communication" should read --communications--, Column 9, claim 4, line 1, start paragraph after ":", Column 10, claim 11, line 24, "director" should read --directory--, Column 10, claim 12, line 30, "communication" should read --communications--, Column 11, claim 20, line 28, "call one" should read --call on one--.

Signed and Sealed this

Twenty-fourth Day of July, 1990

Attest:

HARRY F. MANBECK, JR.

*Attesting Officer*      *Commissioner of Patents and Trademarks*